United States Patent
Pelle

(10) Patent No.: US 11,027,955 B2
(45) Date of Patent: Jun. 8, 2021

(54) APPARATUS FOR THE TRANSFER AND PRESERVATION OF JUICES

(71) Applicant: Gerald J Pelle, Edgecliff (AU)

(72) Inventor: Gerald J Pelle, Edgecliff (AU)

( * ) Notice: Subject to any disclaimer, the term of this patent is extended or adjusted under 35 U.S.C. 154(b) by 0 days.

(21) Appl. No.: 17/029,178

(22) Filed: Sep. 23, 2020

(65) Prior Publication Data
US 2021/0094810 A1   Apr. 1, 2021

Related U.S. Application Data

(60) Provisional application No. 62/906,156, filed on Sep. 26, 2019.

(51) Int. Cl.
*B67C 3/22* (2006.01)
*B01D 29/085* (2006.01)
*B67C 11/00* (2006.01)

(52) U.S. Cl.
CPC .............. *B67C 3/22* (2013.01); *B01D 29/085* (2013.01); *B67C 11/00* (2013.01); *B67C 2011/30* (2013.01)

(58) Field of Classification Search
CPC ..... B67C 11/00; B67C 2011/30; B67C 11/02; B67C 2011/40; B67C 3/22; B01D 29/085
USPC .................................................. 141/363–366
See application file for complete search history.

(56) References Cited

U.S. PATENT DOCUMENTS 279,739 A  *  6/1883  Gifford ................... B67C 11/02
141/299

FOREIGN PATENT DOCUMENTS

FR               393503 A  *  12/1908  ............. B67C 11/02

* cited by examiner

*Primary Examiner* — Jason K Niesz
(74) *Attorney, Agent, or Firm* — Sandy Lipkin

(57) ABSTRACT

An apparatus with a two vents funnel for the transfer and preservation of juices comprising removable vents and outlet extensions at the funnel base; an asymmetrical funnel bowl separated into a main and an overflow chamber, with a pouring lip and its narrow end; a purposefully narrow funnel outlet, with its extension reaching the container's wall during transfer; its seal at the funnel's base with a stop ring; a mesh filter which can be fitted onto the funnel's bowl; and a stand, with an anti-drop plate at its base, which can hold the funnel whereby a user can do the precise transfer of a juice into a receiving container using the seal's stop ring for horizontal alignment and the overflow chamber filling as a clear indication as to when the transfer is complete, this transfer is made bubble-free having the outlet purposely slowing down the flow while at the same time releasing the juice close to the container's inner wall, thus enabling said juice long-term preservation, any leftover into the overflow chamber being easily evacuated through the bowl's narrow end equipped with a pouring lip, and any juice impurities being separated during transfer with the fitted mesh filter, and different receiving containers shape being allowed by simply replacing the extensions and the funnel being cleanly stored away on its stand after use and any drops being then collected by the plate.

8 Claims, 3 Drawing Sheets

APPARATUS FOR THE TRANSFER AND PRESERVATION OF JUICES

REFERENCE TO PRIOR APPLICATION

This application claims priority of the provisional patent application 62/906,156, filed Sep. 26, 2020 entitled AN APPARATUS FOR THE TRANSFER AND PRESERVATION OF JUICES by Gerald J. Pelle.

BACKGROUND OF THE INVENTION

Field of the Invention

The field of this invention relates generally to the field of the preservation of juices and more particularly toward a device that allows for the preservation and transfer of drinkable liquids that oxidize and become foul after prolonged air contact, such as wine and juices.

Description of the Prior Art

To preserve such liquids that oxidize and become foul after prolonged air contact, such as wine and juices, the solution is always the same: reducing the amount of air in contact with the liquid. This can be achieved by pumping the air from the original liquid container (most common solution), by transferring a liquid into a newer container with adjustable head room or by replacing the air present in the container with a heavier neutral gas, typically argon. Unfortunately, those solutions are ineffective or expensive. Pumping the air out offers little protection, for example, a half wine bottle vacuumed still contains 6 times more oxygen than needed to oxidize it, and is damaging to liquids with delicate organic compounds such as wine. Changing to a container with smaller or adjustable headroom works better, but the process introduces oxygen and limits its effectiveness. Also, those custom containers are usually expensive and users are locked into using them. Finally, the use of neutral gas is effective but requires the constant replacement of cartridges, giving this system a quite high total cost of ownership.

A desirable solution should be both effective and cheap to operate and own. Amateur winemakers already observed that they could keep their wine in small, swing-top bottles for a long time, up to years at a time. Those bottles are sturdy and cheap to use. The problem, however, is to transfer an already started wine into one of those bottles. This process is rather cumbersome with high risks of spilling the content. Further, it becomes impossible with heavy bottles, such as magnums, or bottles with a wide opening like bottled juice.

A funnel can simplify the transfer process, but the user then needs to constantly look at the filling level in order to know when to stop and not overfill the swing top bottle. This becomes quickly uncomfortable and requires a certain level of ability not available to the average user. Also, funnels are designed for speed, i.e., using a wide opening and a short outlet, and therefore introduces a lot of bubbles during the transfer, thus limiting their efficiency.

Orr in U.S. Pat. No. 4,202,386 shows a funnel that solves the overfilling problem but has many disadvantages. It can only fit one type of container, the vents and outlet being dependent from each other, the fill up level position effects directly the outlet's length and leaves no option when it comes to reducing the ventilation of the flowing liquid. Also, for a precise filling the user still must know when to stop pouring. Adding a mark is imprecise due to parallax and liquid surface tension and is impractical with dark or opaque liquids.

It is the object of the instant invention to overcome the shortcomings of the prior art and to fully leverage the efficiency and low cost of a swing-top bottles for the preservation of liquids, by allowing to efficiently transfer liquids into those bottles.

SUMMARY OF THE INVENTION

The basic embodiment of the present invention teaches an apparatus for the transfer and preservation of liquids comprising: a container into which liquids will be transferred, said container having an outer wall and an inner wall and a reservoir therebetween to collect said liquids; a funnel apparatus further comprising: a bowl into which liquid can be poured said bowl having a main chamber and an overflow chamber; a first vent; a second vent; a base through which liquid can base therethrough; and a seal at said funnel base.

The above embodiment can be further modified by defining that a purposefully narrowed outlet at said base allows for a controlled liquid pace.

The above embodiment can be further modified by defining that outlet extensions attachable to said outlet wherein when attached to said outlet extension contacts said inner wall of said container.

The above embodiment can be further modified by defining that vents extensions attachable to said vents allow for adjustable filling height of said container and/or for the use of different container size.

The above embodiment can be further modified by defining that a stop ring for said seal allows the horizontal alignment of said funnel.

The above embodiment can be further modified by defining that a mesh filter is placed inside of said asymmetrical shaped bowl.

The above embodiment can be further modified by defining that said funnel apparatus can be removably attached to a storage stand for storage when not in use.

The above embodiment can be further modified by defining that an anti-drop plate is placed below said funnel when attached to said storage stand.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
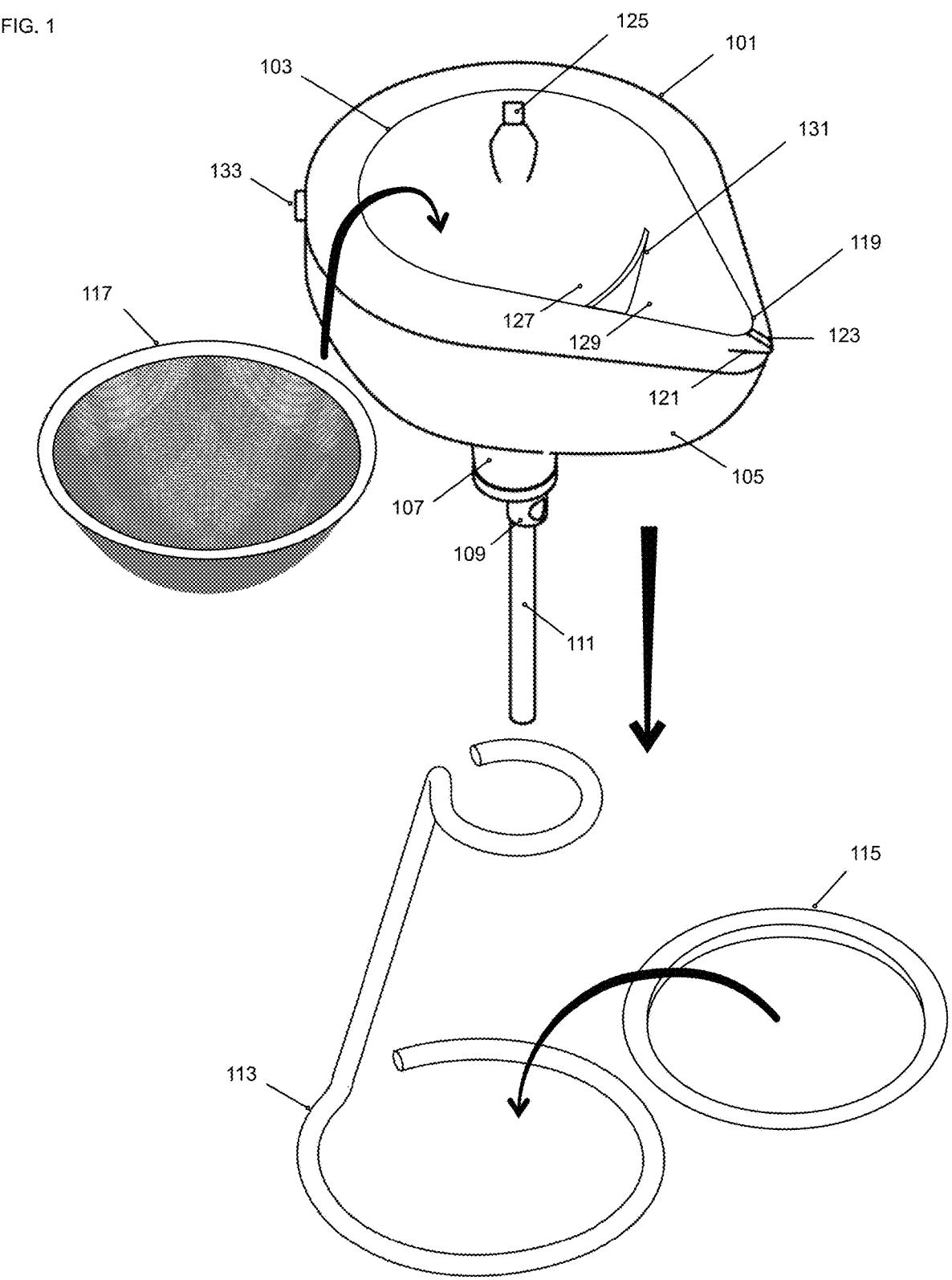
FIG. 1 is a top-down perspective view of the funnel and its components, constructed in accordance with the invention.

Turning to the drawings, the preferred embodiment is illustrated and described by reference characters that denote similar elements throughout the several views of the instant invention.

The preferred embodiment of the instant invention provides for an apparatus composed of a two vents funnel with removable extension tubes to precisely fill a container, such a swing top bottle, thus enabling the long-term preservation of juices at low cost. This funnel is equipped with a double chamber for the user to easily identify when to stop and the seal's stop ring provides visual feedback on closure and the funnel's horizontal alignment. The overflow chamber can be easily emptied thanks to its narrow end with lip. For improved preservation, the funnel eliminates bubbles created while pouring, thanks to its narrow outlet limiting the pouring speed and its outlet extension tube cascading the liquid along the container's wall. To remove impurities, the funnel's bowl can be fitted with a removable mesh filter. And for storage, the funnel can be placed on its stand, equipped with a plate catching any leftover drops.

FIG. 1 is a top-down perspective view of the funnel 101 and its components, constructed in accordance with the invention. There are eight visible parts: the bowl 103 with, right under, its protection shell 105, below the shell there is a seal 107, an outlet tube 109 and an exhaust tube 111, the funnel stand 113 with an anti-drop plate 115, and a mesh filter 117.

The inner side of the bowl is asymmetrical and narrower at its end 119. The narrow part of the bowl is extended by a pouring lip 121 that has a carved notch 123. This inner side has an exit hole 125 and is separated into two chambers, 127 and 129, by a wall 131. The outer side of the bowl has an exit hole 133. The bowl and shell are made of hard plastic, e.g., food-grade PP, the seal is silicone and the other parts (tubes, stand, plate and filter) are stainless steel.

Figure 2:
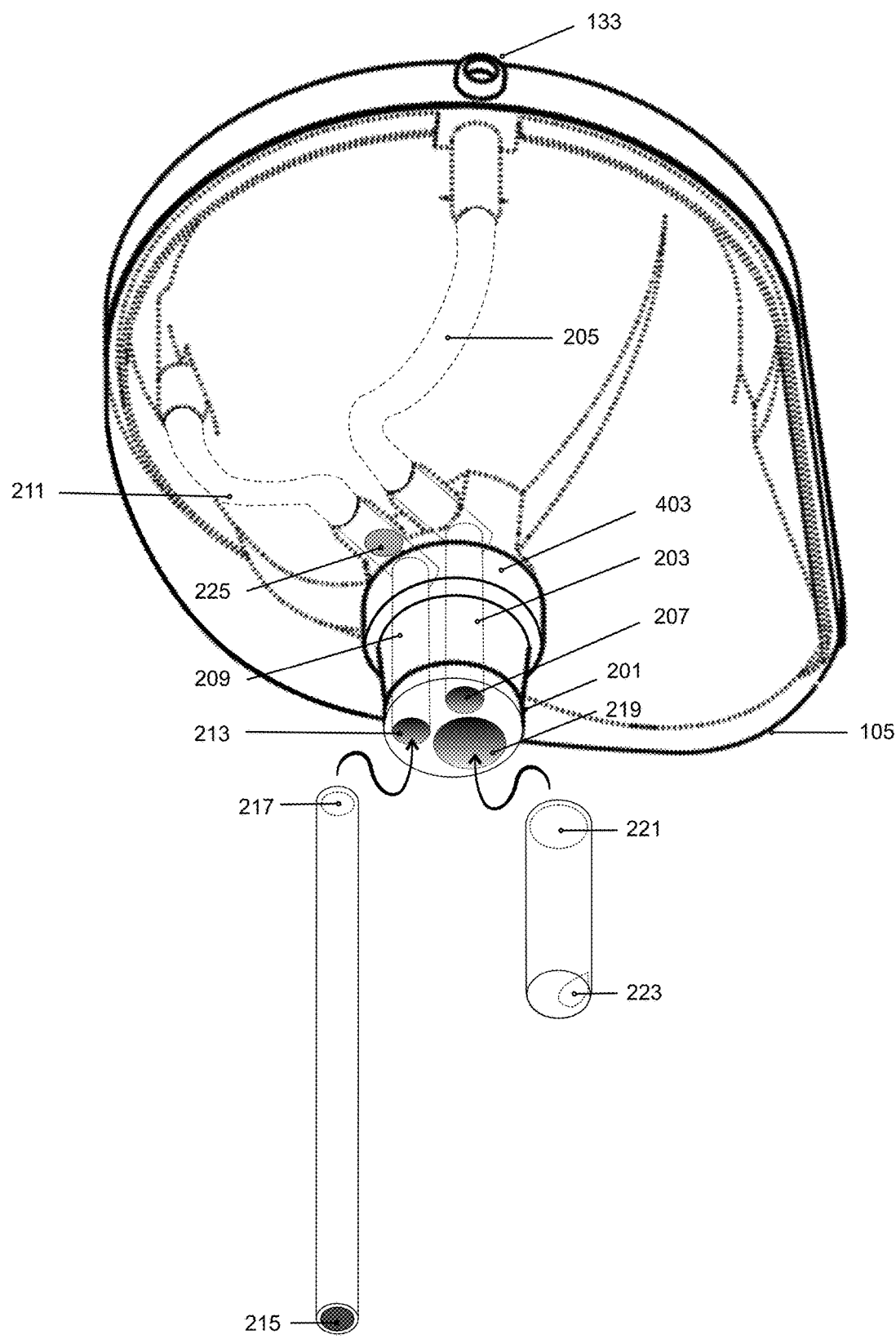
FIG. 2 is a bottom-up view of the funnel of FIG. 1, showing in dotted lines its inner structure and elements.

FIG. 2 is a bottom-up view of the funnel 101, showing in dotted lines the inner structure and elements of the bowl 103. There are two hermetical canals formed within the funnel base 201. The canal 203 is interconnected to the exit hole 133 buy a sleeve 205. The connecting sleeve is preferably elastic and hermetically attached on both sides, that's creating an airtight conduit from the canal entry hall 207 to the exit hole 133. This air-tight conduit is the control vent. Similarly, the canal 209 and the exit hole 125 are hermetically connected by a sleeve 211, forming an airtight conduit from the canal entry hole 213 to the exit hole 125. This air tight conduit is the exhaust vent. This air tight conduit is extended by a tube 111, hermetically inserted into the hole 213. The exhaust tube 111 has holes on both ends: the entry hole 215 and the exit hole 217.

Inserted into the outlet exit 219, is the tube 109 with on one side an entry hole 221 and the side exit hole 223 on the other. The diameter of this exit hole 223 is made in such a way that it allows for a steady and controlled pouring flow through the funnel, roughly 5 millimeters. Both tubes can be removed from their respective canals. While inserted, they are kept in position preferably by friction, but could also be screwed on. At the base of the protection shell 105 there is a small evacuation hole 225.

Figure 3:
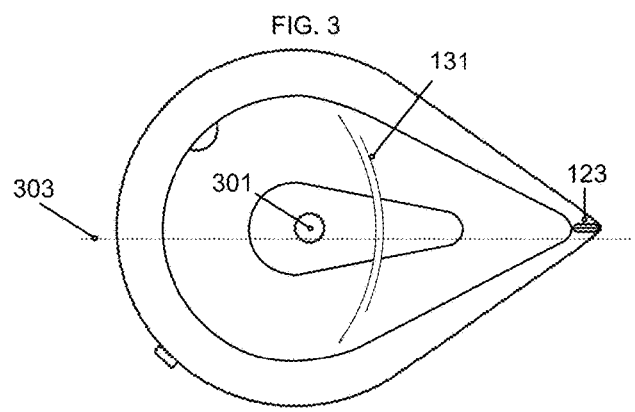
FIG. 3 is a top view of the funnel.

FIG. 3 is a top view of the funnel, showing the outlet entry hole 301, the curved separation wall 131 and the notched lip 123.

Figure 4:
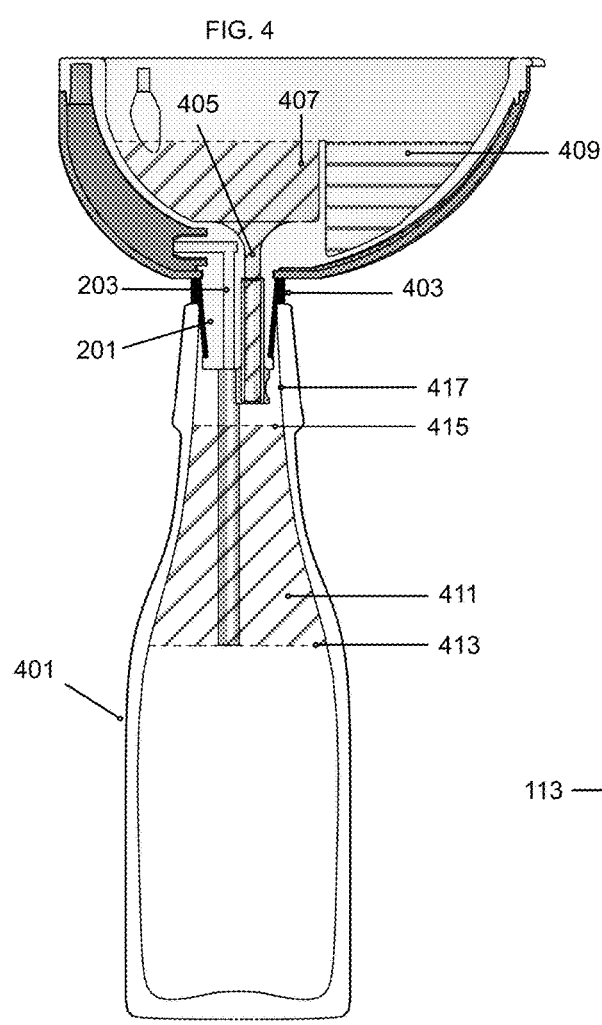
FIG. 4 is a vertical cross-section of the funnel inserted into a container.

FIG. 4 is a vertical cross-section at location 303 of the funnel inserted into a container 401. The funnel and the container are hermetically connected at the funnel base 201 with the seal 107. This seal is tapered and has a top stop ring 403. The final main chamber 127 ends at its base into the outlet canal 405, itself extended by the outlet tube 109. The volume 407 contained within the main chamber is roughly 35 ml. The overflow chamber volume 409 is roughly 12 ml. The volume 411 inside the container is equal to the volume 407 of the main chamber.

Figure 5:
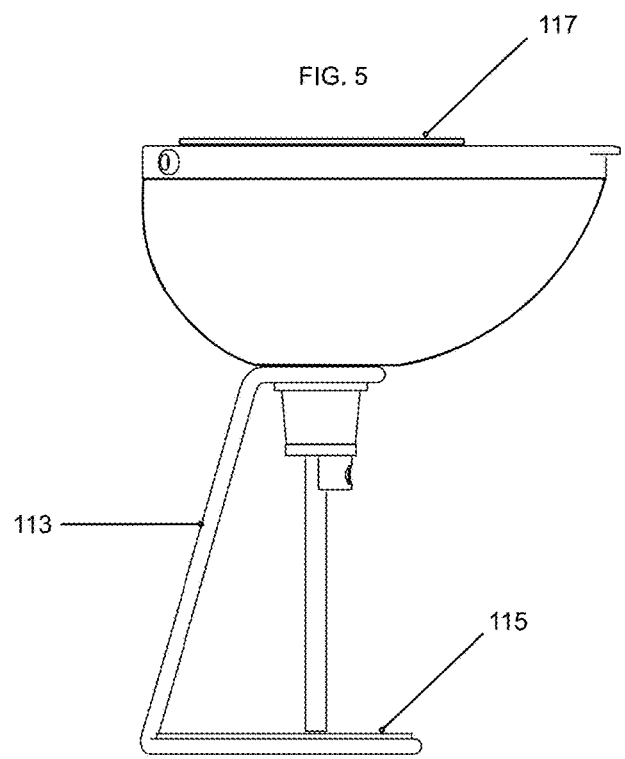
FIG. 5 is a side view of the funnel with its filter sitting on its stand.

FIG. 5 is a side view of the funnel sitting on the stand 113 with its anti-drop plate 115 installed at the base. The filter 117 is inserted on the top of the funnel.

The funnel 101 is securely and hermetically inserted into the container 401, so that the container's inlet touches the seal's stop ring 403. The seal's stop ring can then be used to visually check the funnel's horizontal alignment and make sure the funnel will not be tilted during a transfer. The user then closes hermetically the control vent by covering the hole 133 with a thumb or a finger. The liquid can now be poured into the main chamber 127. The liquid enters the outlet entry 301 and leaves the funnel into the container through the outlet tube side exit 223. This exit being close to the container's inner wall 417, the liquid cascades gently down without the creation of bubbles. An alternative is to have the outlet tube extended so low it reaches the container's bottom. To allow for a liquid that is free from bubbles while pouring, a slow and steady flow is created by having the outlet tube diameter narrowed. In this case, constraining the diameter of the side exit hole 223 to roughly 5 mm. By doing so, the user keeps the funnel outlet entry 301 constantly immersed in liquid and avoids the introduction of bubbles while pouring. Once the liquid fills up the container up to the level 413 of the exhaust vent entry hole 215, no more liquid can enter and the main chamber 127 starts to fill up. As soon as the liquid overflows the main chamber into the overflow chamber 129, the user stops pouring and opens the control vent by removing the thumb or finger from the hole 133. The liquid then present in the main chamber 127 drains into the container, filling it up to the level 415. The transfer has been complete and the funnel can now be separated from the container. Any overflow present in the overflow chamber can be discarded, or poured back into where it came from, through the bowl's narrow end 119 extended by the lip 121 with guiding notch 123 for a clean pour.

When a different container type is used, with a different shape or size, there is no need to change the funnel. Only switching the exhaust tube 111 to the correct filling dimensions of the new container is required. The volume of the funnel main chamber being constant at roughly 35 ml, when a wide neck container is used, the exhaust pipe will be shorter than for a container with a narrower neck. Similarly, to keep the filling bubble-free, the outlet tube 109 can be replaced by a different tube. For example, one being as long as the container height so that the outlet tube exit comes close to the container's bottom.

When transferring a liquid with impurities, the mesh filter 117 can be added on the top of the funnel. The transfer process stays the same while impurities or sediments are caught by the filter. The visibility into the main chamber being somehow limited by the filter, the overfilling into the overflow chamber provides visual feedback when to stop pouring and to open the control vent 133.

Once the process is completed, the funnel can be stored on its stand 113, while the anti-drop plate 115 collect any drops that could still be released by the funnel. Sanitation of the funnel is facilitated by the presence of the evacuation hole 225 which ventilates the volume between the protection shell 105 and the bowl 103.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An apparatus for the transfer and preservation of liquids comprising:
    a container into which liquids will be transferred, said container having an outer wall and an inner wall and a reservoir located within said inner wall to collect said liquids;
    a funnel apparatus further comprising:
        a bowl into which liquid can be poured said bowl having a main chamber and an overflow chamber;
        a first vent;
        a second vent;
        a base through which liquid can base therethrough; and
        a seal at said funnel base.

2. The apparatus as defined in claim 1 wherein a purposefully narrowed outlet at said base allows for a controlled liquid pace.

3. The apparatus as defined in claim 1 wherein said base further comprises an outlet, said outlet comprising an outlet extension wherein when said outlet extension is attached to said outlet, liquid which passes through said base is directed against said inner wall of said container.

4. The apparatus as defined in claim 1 wherein said base further comprises vents extensions attachable to said first and second vents to adjust liquid filling height and/or to adapt the apparatus for with a container of a different size.

5. The apparatus as defined in claim 1 wherein a stop ring for said seal allows the horizontal alignment of said funnel.

6. The apparatus as defined in claim 1 wherein a mesh filter is placed inside of said asymmetrical shaped bowl.

7. The apparatus as defined in claim 1 wherein said funnel apparatus further comprises a storage stand which can be removably attached for storage when not in use.

8. The apparatus as defined in claim 7 wherein an anti-drop plate is placed below said funnel when attached to said storage stand.

* * * * *